United States Patent

[11] 3,593,383

| [72] | Inventor | Roger H. Ellis<br>Atherton, Calif. |
|---|---|---|
| [21] | Appl. No. | 775,296 |
| [22] | Filed | Nov. 13, 1968 |
| [45] | Patented | July 20, 1971 |
| [73] | Assignee | Raychem Corporation<br>Menlo Park, Calif. |

[54] HEAT-SHRINKABLE CABLE TIE
5 Claims, 5 Drawing Figs.

[52] U.S. Cl. ................................................. 24/16 PB
[51] Int. Cl. .................................................. B65d 63/00
[50] Field of Search ........................................... 248/74;
24/16, 19, 73.7; 128/DIG. 18

[56] References Cited
UNITED STATES PATENTS

| 2,027,962 | 1/1936 | Currie | 128/DIG. 18 |
|---|---|---|---|
| 3,445,898 | 5/1969 | Goodrich | 24/16 PB |

*Primary Examiner*—Donald A. Griffin
*Attorney*—Lyon and Lyon

ABSTRACT: A tie for use with cables, wire bundles, or the like the differing sizes fabricated from heat-recoverable tubing which is expanded in both the diametrical and longitudinal directions. An insert is positioned in one end of the tubing and this end of the tubing is telescoped within the other end. Upon recovery, the shrinkage of the material causes both the two ends of the tubing to be held together and the wire bundle to be secured.

PATENTED JUL 20 1971
3,593,383
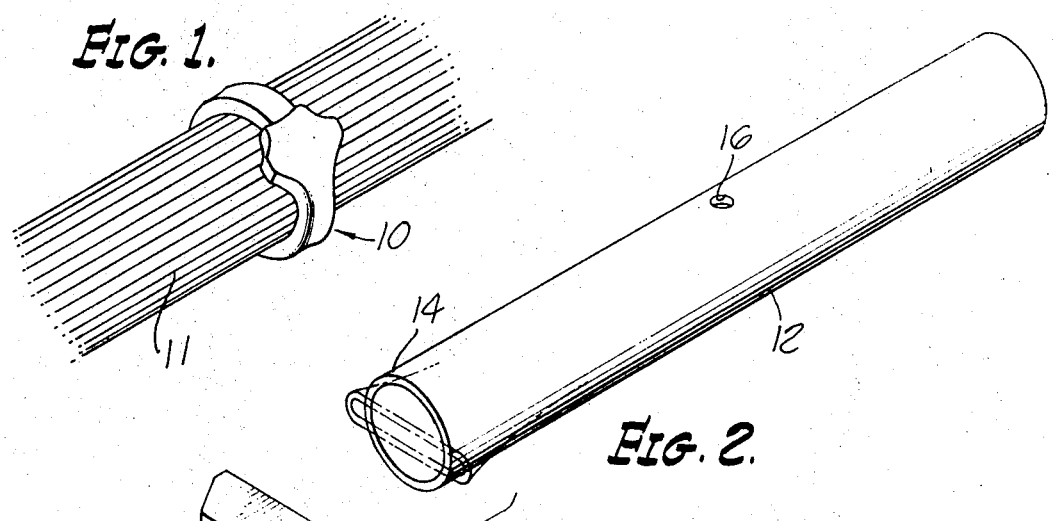
FIG. 1.
FIG. 2.
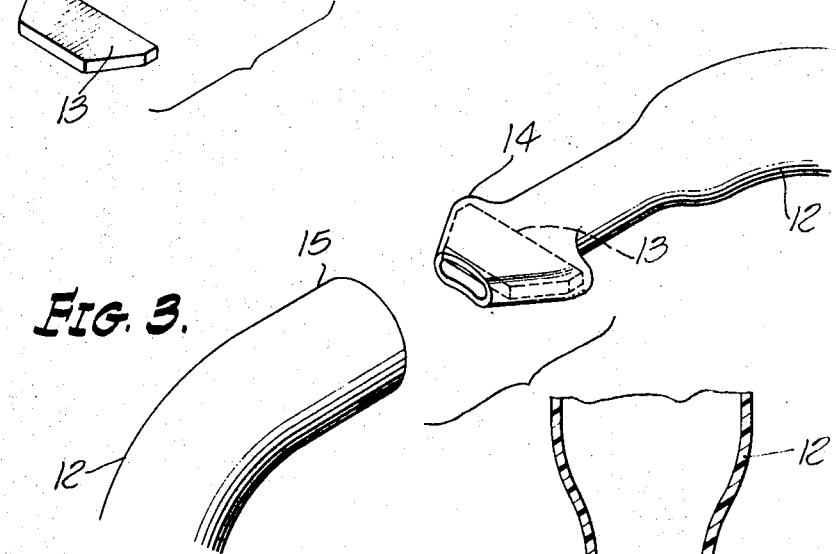
FIG. 3.
FIG. 5.
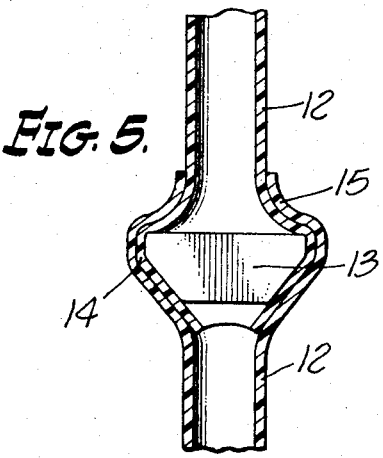
FIG. 4.
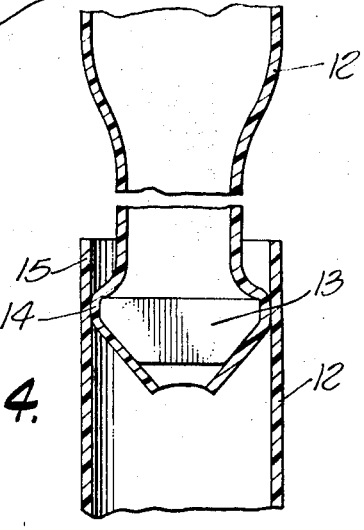
INVENTOR
ROGER H. ELLIS
BY Lyon & Lyon
ATTORNEYS

HEAT-SHRINKABLE CABLE TIE

BACKGROUND OF THE INVENTION

Many tying devices have in the past been provided for securely holding together a plurality of wires or cables or the like. These ties are generally flexible to a degree and are maintained in their final tying position by some mechanical joining device such as a nut and bolt. Because the flexibility of such ties is limited, a given tie is only useful with a wire bundle of limited overall thickness. Consequently, a considerable inventory of different size ties must be maintained in order for a workman to be able to deal with a large variety of sizes of wire or cable bundles.

SUMMARY OF THE INVENTION

According to the present invention, a tie is provided which is usable with a wide range of wire or cable bundle sizes and which can be easily and quickly installed. This is made possible by the use of a length of heat-shrinkable tubing as the basic component of the tie. The tubing is expanded in both the longitudinal and diametrical directions and a suitable insert then located in one end of the tubing by diametrically shrinking this end of the tubing around the insert. To install the tie, the workman need only wrap the tubing around the bundle of objects to be tied, insert the end of the tubing containing the insert into the other end of the tubing and heat the tubing to cause its recovery. The tubing contracts diametrically so that the two ends are locked firmly together and contracts longitudinally so that the objects in the bundle are secured.

BRIEF DESCRIPTION OF THE DRAWINGS

FIG. 1 is a perspective view of the tie of the present invention installed on a bundle of wires or the like;

FIG. 2 is a perspective view of a piece of expanded tubing ready to receive an insert;

FIG. 3 is a perspective view of the tie of the present invention with the ends about to be joined;

FIG. 4 is a cross-sectional view of the tie of the present invention after the ends have been joined but before recovery; and FIG. 5 is a cross-sectional view of the tie of the present invention after recovery.

DESCRIPTION OF THE INVENTION

FIG. 1 shows the tie 10 of the present invention installed on a bundle of wires 11 to securely bind these wires together. The other figures show the manner in which the tie is assembled and installed. The components of the tie are a length of heat-recoverable tubing 12 and a wedge-shaped insert 13 which may be constructed of metal or a suitable plastic. The insert 13, could, of course, take any desired shape. The tubing 12 comprises an independently dimensionally heat-unstable member.

In general, such a member may be a sleeve which has been expanded both longitudinally and diametrically. Examples of suitable materials for such a sleeve may be found in Currie U.S. Pat. No. 2,027,965 and Cook et al. U.S. Pat. No. 3,086,242, the disclosures of which are incorporated herein by reference. Polymeric materials which have been crosslinked by chemical means or by irradiation, for example, with high-energy electrons or nuclear irradiation, such as those disclosed in the Cook et al. patent, are preferred for use in the present invention. Rubbers or noncrystalline polymeric materials exhibiting the property of plastic or elastic memory such as polyurethane, ionomers, etc. could also be used in the present invention. Since materials possessing either plastic memory or elastic memory are equally useful in the present invention, these terms are used interchangeably and are meant to be mutually inclusive.

After the tubing 12 has been expanded in both the longitudinal and diametrical directions, the end 14 of the tubing is flattened and the insert 13 inserted in the end 14. The width of the insert 13 should be larger than the recovered flattened width of the end 14 of the tubing 12. The end 14 of the tubing 12 is then heated to the heat recovery temperature of the material of the tubing so that this end shrinks diametrically to lock the insert into place. The configuration of the end 14 after this locking step can be seen in FIG. 3.

The tie is now ready for use. To install the tie, the workman wraps the tubing 12 around the wires to be bound and inserts the end 14 containing the insert 13 into the other end 15 of the tubing. The tubing is now heated by hot air, infrared radiation, or the like to raise it to above its heat recovery temperature, the heating preferably beginning at the joint of the ends 14 and 15. Heating the tubing causes it to contract diametrically with the result that the end 15 recovers down around the end 14 containing the insert 13 as shown in FIG. 5. This securely locks the ends of the tie together. Heating of the tubing also causes its longitudinal recovery so that it tightens on the wire bundle until the wire bundle offers sufficient resistance so that the tubing can shrink no further. The tubing, of course, should be selected so that its recovered length is less than the perimeter of the bundle to be tied. Preferably, the tubing 12 is provided with a hole 16 which permits the air trapped inside the tubing to escape when the tubing recovers.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A tie comprising an elongated tubular member, an insert securely positioned in said member adjacent one end thereof, the other end of said member being transversely heat recoverable and at least an intermediate portion of said member being longitudinally heat recoverable.

2. A tie comprising an elongated tubular member comprising material which has been diametrically and longitudinally expanded from an original heat stable form to an independently heat-unstable form capable of shrinking in both the transverse and longitudinal directions upon the application of heat alone, and an insert securely positioned in said member adjacent one end thereof, said one end and said insert being capable of being telescoped into the other end of said member whereby application of heat will cause the material of said other end to shrink and firmly grasp said one end.

3. The tie of claim 2 wherein said insert is securely positioned in said one end by shrinkage of the material of said one end around said insert.

4. The tie of claim 3 wherein said insert is tapered, the wider portion of said insert being remote from said one end.

5. The tie of claim 2 wherein said tubular member is provided with means to permit the escape of air.